United States Patent [19]

Hehl

[11] Patent Number: 4,698,007
[45] Date of Patent: * Oct. 6, 1987

[54] HORIZONTAL MOLD CLOSING UNIT FOR AN INJECTION MOLDING MACHINE

[76] Inventor: Karl Hehl, Artur-Hehl-Strasse 32, D-7298 Lossburg 1, Fed. Rep. of Germany

[*] Notice: The portion of the term of this patent subsequent to Jul. 31, 2001 has been disclaimed.

[21] Appl. No.: 839,173

[22] Filed: Mar. 13, 1986

[30] Foreign Application Priority Data

Mar. 13, 1985 [DE] Fed. Rep. of Germany ....... 3508867

[51] Int. Cl.$^4$ ............................................. A01J 21/00
[52] U.S. Cl. .................................... 425/190; 425/193; 425/451; 425/589; 100/918
[58] Field of Search ............ 425/589, 595, 451, 451.2, 425/190, 193; 100/918

[56] References Cited

U.S. PATENT DOCUMENTS

| | | | |
|---|---|---|---|
| 4,462,783 | 7/1984 | Hehl | 425/183 |
| 4,472,127 | 9/1984 | Cyriax et al. | 425/190 |
| 4,500,274 | 2/1985 | Cyriax et al. | 425/190 |

FOREIGN PATENT DOCUMENTS

92686   3/1983  European Pat. Off. .
2332205 1/1975  Fed. Rep. of Germany .

Primary Examiner—Bernard Nozick
Attorney, Agent, or Firm—Spencer & Frank

[57] ABSTRACT

A horizontal mold closing unit for an injection molding machine includes a mold exchanging device, and injection mold assembly having a mold body and back plates attached face-to-face to the mold body at each clamping side thereof. The back plates have an extended portion projecting beyond a frontal side of the mold body. There is further provided a mold exchanging table forming part of the mold exchanging device and being arranged for displacement adjacent the mold closing unit in a direction parallel to a mold closing direction, and an endless conveyor chain arranged to convey the injection mold assembly, by cooperating with coupling elements in the back plates, from the mold exchanging table to the clamping space of the mold closing unit and conversely. The endless conveyor chain has a chain driving end sprocket and an idling end sprocket mounted on the mold exchanging table and supporting the conveyor chain thereon. The conveyor chain is arranged symmetrically at either side of a vertical symmetry plane belonging to the mold exchanging table and extending parallel to the mold closing direction. The coupling elements are transverse grooves provided in at least one of the back plates in at least the extended portion thereof. The transverse grooves extend transversely to a main plane of the back plate.

15 Claims, 12 Drawing Figures

HORIZONTAL MOLD CLOSING UNIT FOR AN INJECTION MOLDING MACHINE

BACKGROUND OF THE INVENTION

This invention relates to a horizontally oriented mold closing unit for an injection molding machine and is of the type which has an automatic mold exchanging device as well as an associated injection mold assembly having a mold body composed of standardized plates. The mold body is, on the clamping sides, bounded by respective back plates which project beyond at least one end face of the mold body. The mold closing unit further has coupling members at the underside of the injection mold assembly as well as a mold exchanging table which is shiftable in the mold closing direction in guides to both sides of the lateral prolongation of the mold clamping space of the die closing unit throughout a displacement path which corresponds at least to the height of one mold. The injection mold assembly is moved on a conveying track into the mold clamping space from the mold exchanging table with the aid of an endless conveyor chain engaging the injection mold assembly from below by means of the coupling means.

In a die closing unit of the above-outlined known type, as disclosed, for example, in German Pat. No. 3,242,169, to which corresponds U.S. Pat. No. 4,462,783, the injection mold assembly is connectable to the conveyor chain by a coupling bar movably supported in the conveying track. The conveyor chain is, in the zone between the mold clamping space of the die closing unit and the mold exchanging table, disposed in a horizontal plane, that is, its end sprockets have a vertical axis. During the coupling step, the carrier members of the conveyor chain slide, in the zones of chain reversal, laterally into a corresponding horizontal transverse groove of the coupling bar. The coupling bar is, in turn, provided with carrier pins for establishing coupling with the injection mold assembly. The carrier pins project, from below, into corresponding bores provided in the mold body. The gliding support for the coupling bar is situated necessarily in the zone of the clamping space which is disadvantageous in that access to the clamping space is significantly limited.

It is further known to provide injection mold assemblies with back plates which project beyond the quadratic mold body at both end faces thereof. Such an arrangement is disclosed, for example, in German Offenlegungsschrift (Non-Examined Published Patent Application) No. 2,332,205 and European Patent Application No. 92,686. These prior art constructions, however, serve other purposes; they provide for example, the injection mold assembly with coolant and power.

SUMMARY OF THE INVENTION

It is an object of the invention to provide an improved mold closing unit of the above-outlined type which makes possible that an injection mold assembly which is positioned on a conveyor table behind the mold exchanging table, may be directly grasped by the conveyor chain of the mold exchanging device and conveyed through a path which is twice as long as the conveying path of the injection mold assembly from the mold exchanging table to the working position in the clamping space of the mold closing unit, without the need for modifications for the coupling engagement of the conveyor chain with the mold body.

This object and others to become apparent as the specification progresses, are accomplished by the invention, according to which, briefly stated, the conveyor chain is arranged, together with a driving end sprocket and an idling end sprocket on the mold exchanging table in such a manner that it extends approximately symmetrically on either side of a longitudinal axis of the mold exchanging table. The axis extends parallel to the closing direction of the mold closing unit. Further, the coupling components are arranged at least on one back plate, at least in that zone which projects beyond the end face of the mold body.

In the arrangement according to the invention, the lower entrance or, respectively, exit into and out of the mold clamping space of the mold closing unit is substantially free from driving mechanisms of the mold exchanging device and, particularly, the mold clamping space is void of the sliding bed of a coupling bar. This arrangement significantly facilitates the installation or addition of special equipment (such as devices for handling cores or for separating the molded piece from its sprue). The mold exchanging device is of simpler construction because the conveyor chain may be directly coupled to the injection mold assembly. The requirement for differently dimensioned injection mold assemblies may be met by providing that differently sized mold bodies are combined with back plates of identical size. That is, the back plates are standardized. In this manner, injection mold assemblies with mold bodies of different sizes may be used in a standardized mold exchanging device without the need for changes on such mold bodies.

The conveyor chain may be connected to or disconnected from an injection mold assembly - which was moved onto a conveyor table immediately behind the mold exchanging table when a carrier element of the conveyor chain is flush with a frontal transverse groove of the injection mold assembly, as viewed in the closing direction of the mold closing unit. For achieving a properly oriented coupling engagement, the conveyor table is arrested in its conveying motion if the inlet portion of the transverse groove is situated above the carrier element. Upon releasing the coupling, the carrier element surrounded by the transverse groove moves out of the zone of the transverse groove by virtue of the conveying motion of the conveyor table and is thus moved out into a disengaged position. The transverse groove presents a free path which permits a conveying motion of the conveyor table even if a carrier element is situated flush with the conveyor chain.

DESCRIPTION OF THE PREFERRED EMBODIMENT

Figures 1, 2:
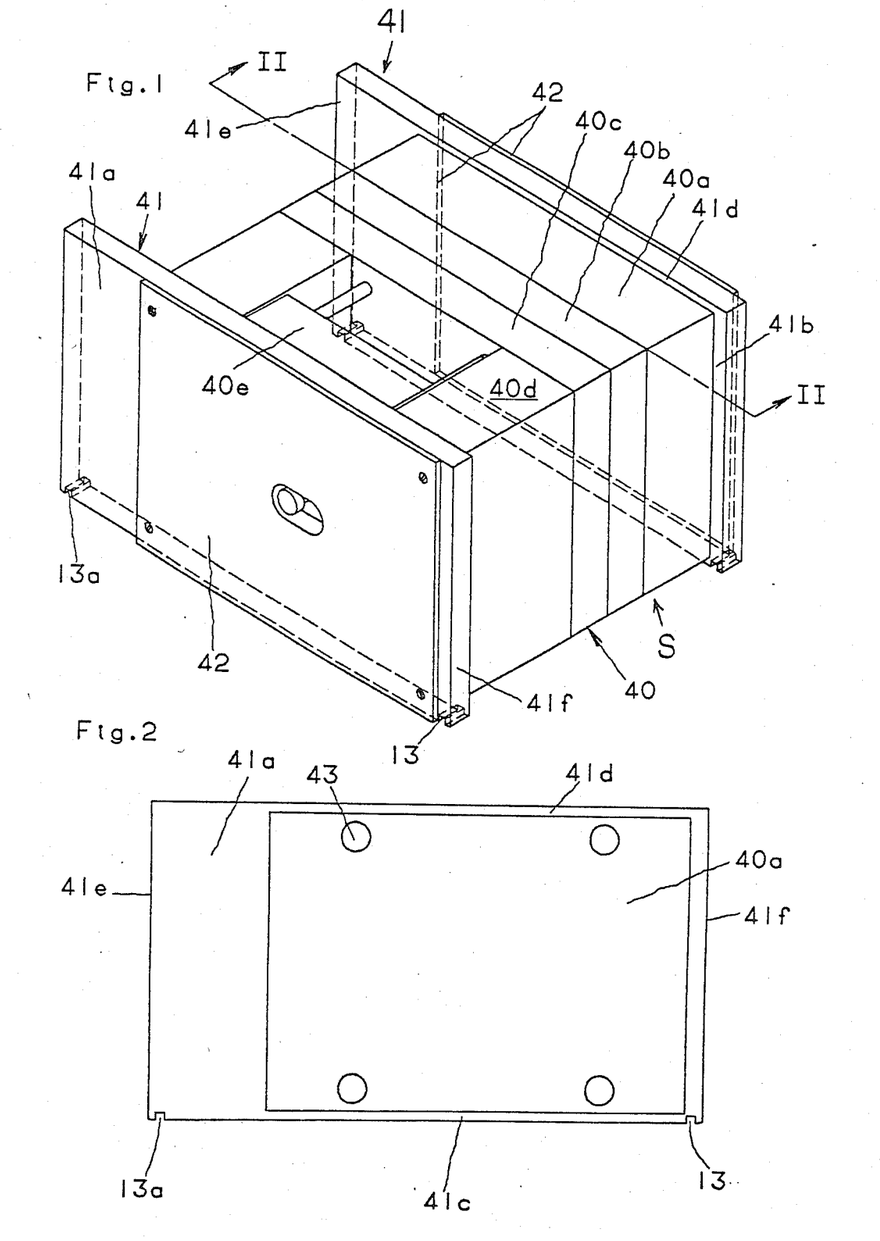
FIG. 1 is a perspective view of an injection mold assembly forming part of a mold closing unit according to the invention.
FIG. 2 is a sectional view taken along line II—II of FIG. 1.
Figure 3:
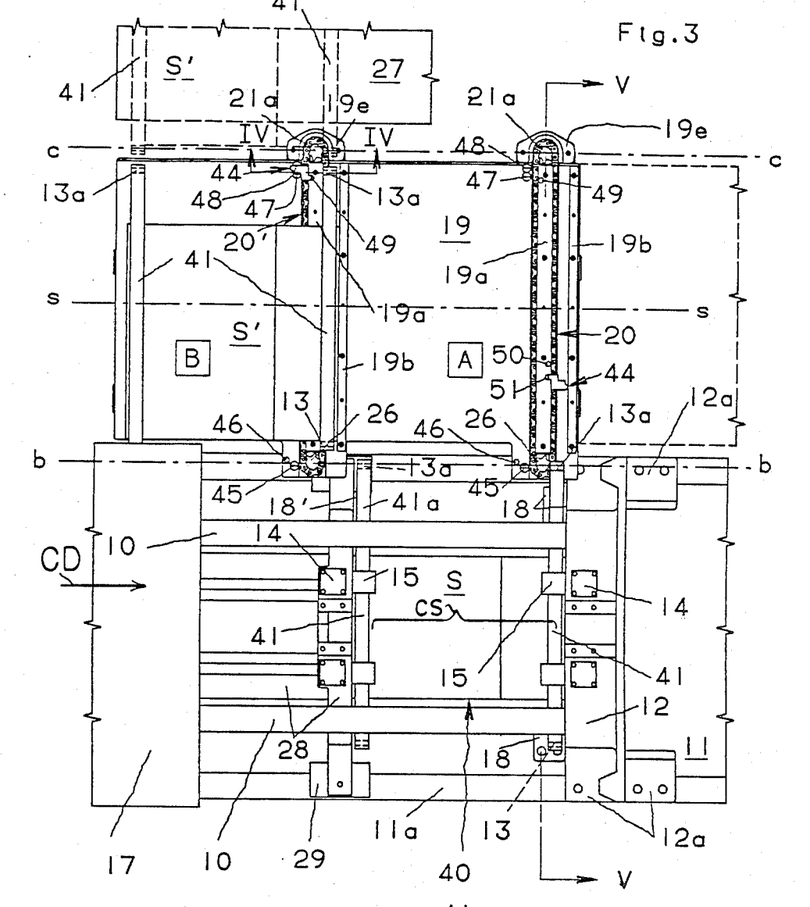
FIG. 3 is a top plan view of a preferred embodiment of one part of the mold closing unit in the zone of the mold exchanging device.

Turning now to FIGS. 1, 2 and 3, the injection mold assemblies S, S' include a rectangular mold body 40 formed of standardized plates and two rectangular back plates 41 bounding the mold body 40 on each clamping side. The back plates 41 are secured to the mold body 40 by means of centering elements 43 and form integral parts thereof. Each back plate 41 is provided with an insulating plate 42 on its face oriented towards the respective clamping side. the back plates 41 project beyond the mold body 40 on all sides thereof, As it may be best observed in FIG. 2. The guiding zone 41c of the back plates 41, projecting downwardly beyond the lower horizontal edge of the mold body 40 serves for guiding the injection mold assembly S, S' between guide strips 19a, 19b of the mold exchanging table 19 and the conveyor table 27, respectively. In the mold clamping space CS the injection mold assembly S or S' slides or rolls onto support elements 18, 18' which are secured to mold carriers 12, 28, respectively. Both back plates 41 are, in the guiding zone 41c, provided with two outwardly open, throughgoing transverse grooves 13, 13a which have a rectangular cross section and which extend in the closing direction CD of the mold closing unit. The coupling zone 41a of the back plates 41, projecting significantly behind the mold body 40, makes possible a relocation of the rear transverse grooves 13a of the injection mold assembly S or S' situated in the working position, into the zone of the conveyor chains 20, 20' to effect a coupling engagement with the carriers 20a, 20a', shown in FIG. 4. The guide zones 41c as well as the clamping zones 41d of the back plates 41, projecting upwardly beyond the mold body 40 serve for the tightening of the mold halves to the mold carriers 12, 28 by means of clamping bolts 14 which are controlled by hydraulic cylinders 14. The clamping bolts 15 engage behind the back plates 41 in the mentioned zones by means of clamping lugs as seen in particular in FIG. 5, viewed together with FIG. 3. The transverse grooves 13, 13a of each back plate 41 are situated at a distance from one another which is shorter than the conveying path of the injection mold assembly S or S' from the emplacement A or B of the exchanging table 19 in the working position. The transverse grooves 13, 13a are each situated in the immediate vicinity of frontal edges 41e and 41f of the respective back plate 41. The movable mold carrier 28 is guided on columns 10 and is supported by supporting elements 29 on the guide rails 11a of the machine stand 11. The stationary mold carrier 12 rests in a bridge-like manner on the guide rails 11a with the intermediary of platform ribs 12. A protective cover 17 covers the drive assembly for the movable mold carrier 28.

The mold exchanging table 19 is, adjacent the mold clamping space CS, displaceable by means of a hydraulic drive assembly 24 parallel to the closing direction CD on guide columns 23 to both sides bilaterally of a lateral prolongation of the clamping space at least to an extent which corresponds to the dimension of one mold assembly. A support component 22 receiving the guide columns 23 is secured to an adjacent guide rail 11a and engages a console 25.

Figure 4:
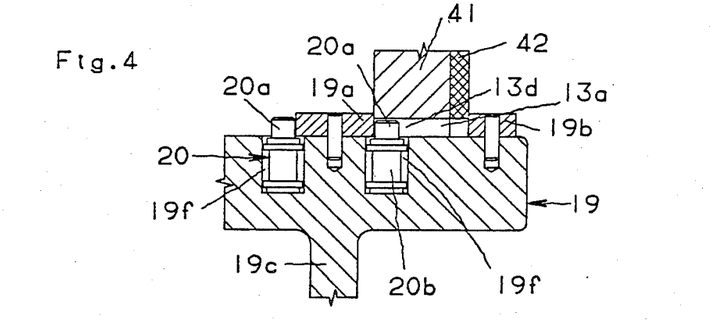
FIG. 4 is a detailed sectional view taken along line IV—IV of FIG. 3 on an enlarged scale.
Figure 5:
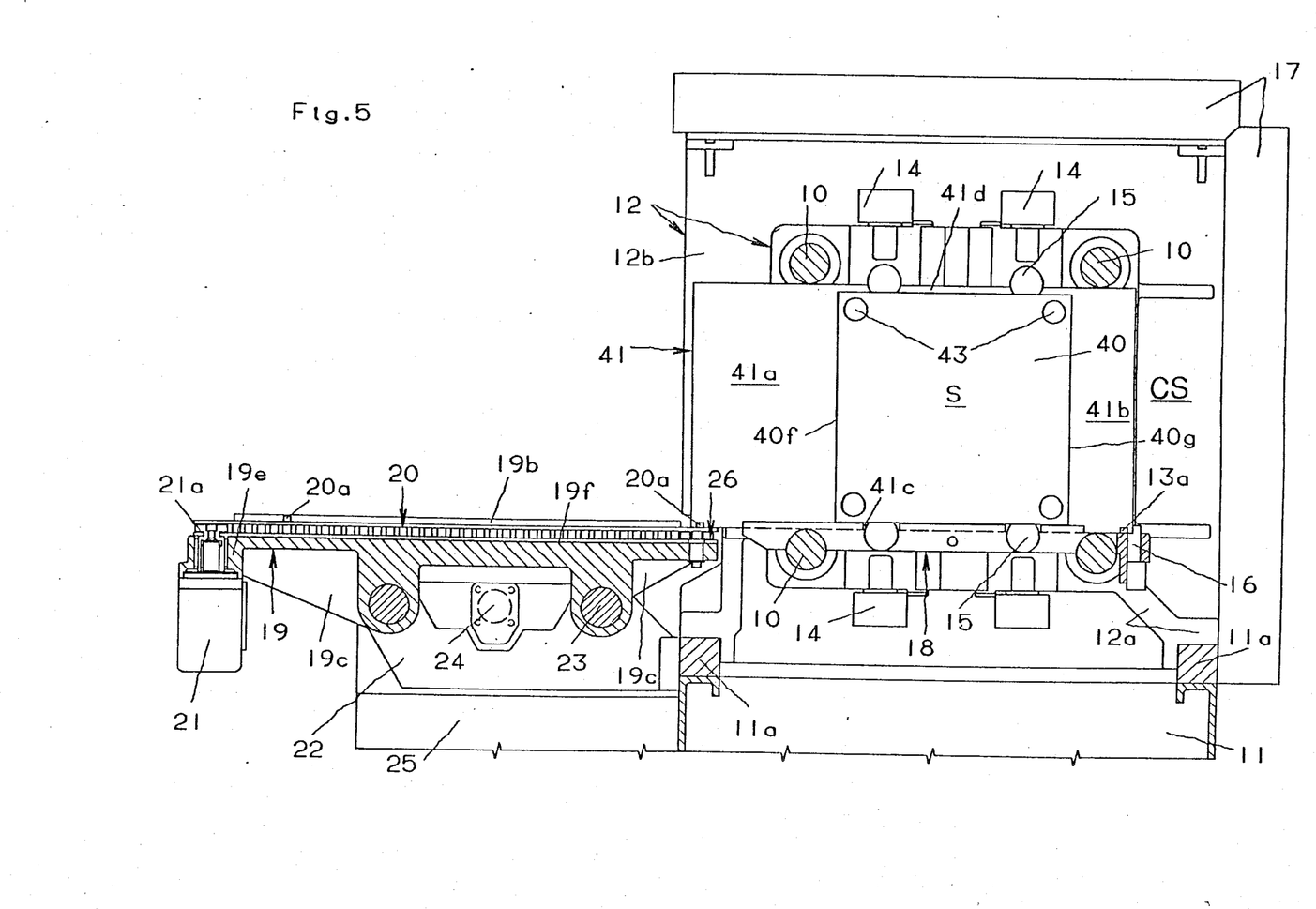
FIG. 5 is a detailed sectional view taken along line V—V of FIG. 3, shown on an enlarged scale.

The conveyor chains 20, 20' having end sprockets 21a, 26 with vertical axes, are arranged on the mold exchanging table 19 approximately symmetrically to a symmetry plane s-s which belongs to the mold exchanging table 19 and which is oriented parallel to the closing direction. The conveyor chains 20, 20' project beyond the longitudinal end of the mold exchanging table 19 in the zone of the end sprockets 21a, 26. As shown in FIG. 5, the driving sprocket 21a is keyed to the vertical shaft of a coaxial drive motor 21 which is supported in a nest 19e of the mold exchanging table 19. As shown in FIG. 3, the conveyor chains 20, 20' bound the emplacements A and B on their respective right side in such a manner that the right-hand flight of the conveyor chain 20 or 20' passes underneath back plate 41. The conveyor chains 20, 20' are recessed in grooves 19f provided in the mold exchanging table 19. The pin-like carriers 20a, 20a' project upwardly beyond the emplacement faces of the emplacements A and B. The carriers 20a, 20a' are formed as extensions of the chain link pins 20b of the conveyor chains 20, 20'. Upon coupling engagement, at least one carrier 20a, 20a' is situated in an entrance portion 13d of a transverse groove 13 or 13a. The length of the entrance portion 13d is approximately one third of the entire length of the transverse groove 13 or 13a, as shown in FIG. 4.

The dimensions of the mold exchanging table 19 and the back plate 41 measured perpendicularly to the closing direction are so selected that the rear transverse grooves 13a of an injection mold assembly S or, respectively, S' set on the emplacement A or B are just inside the rectangular outline of the mold exchanging table 19, whereas the frontal transverse grooves 13 are still situated externally thereof. The vertical axes of the idling sprockets 26 of the conveyor chains 20, 20' are approximately flush with the rear transverse grooves 13a of the injection mold assembly S situated in the working position. Thus, the axes of the transverse grooves are situated in a common plane b—b, oriented parallel to the closing direction. The frontal transverse grooves 13 of the injection mold assembly S or S' positioned on the conveyor table 27 are situated, together with the vertical axes of the driving sprockets 21a in a common plane c—c. The conveyor table 27 is guided parallel to the closing direction of the mold closing unit and serves as a conveyor for the injection mold assembly.

The run of the conveyor chains 20, 20' is controlled by means of a control element 44 secured to each conveyor chain. By means of control tabs 44a, 44b of the control element 44, limit switches 46, 49, 50 and 51 mounted on the mold exchanging table 19 may be actuated. The limit switches are components, for example, of a control circuit of the chain drive motor 21. Abutment edges 44c on the opposite sides of the control element 44 may engage stops 45, 47 and 48 of the mold exchanging table 19 in order to accurately define the stop positions of the conveyor chains 20 and 20', respectively. The stop switches (limit switches) 46 and 49 and the stops 45, 47 and 48 are arranged on the mold exchanging table 19 in such a manner that the switching tab 44a stops the run of the respective conveyor chain by actuating the stop switch 46 or 49 and, at the same time, one of the abutment edges 44c engages a stop 45, 47 and 48 if a carrier 20a or 20a' is in alignment with the transverse groove 13 or 13a of the injection mold assembly S or S' situated on the conveyor table 24 or when the injection mold assembly S or S' has reached its preheating position on the mold exchanging table 19.

Figure 10:
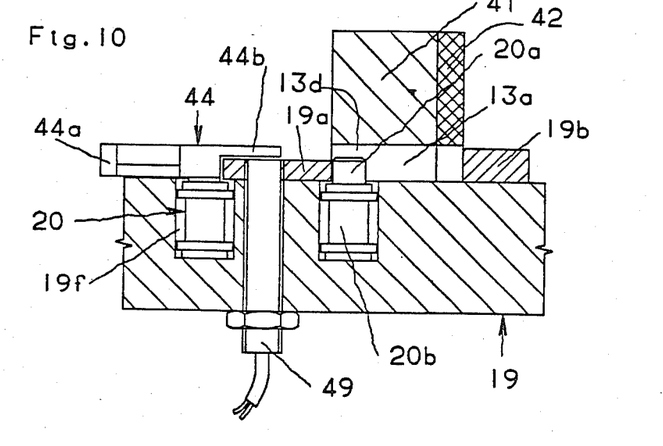
FIG. 10 is a sectional view taken along line X—X of FIG. 7 on an enlarged scale.
Figure 11:
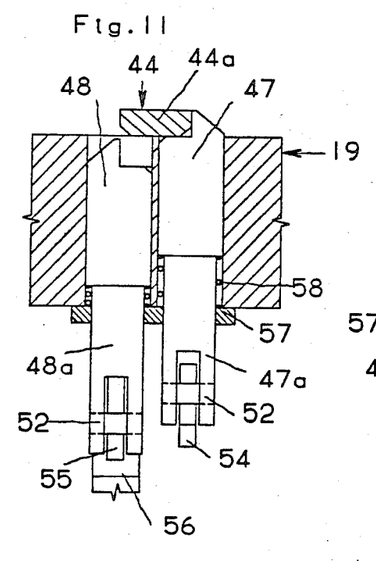
FIG. 11 is a sectional view taken along line XI—XI of FIG. 7 on an enlarged scale.
Figure 12:
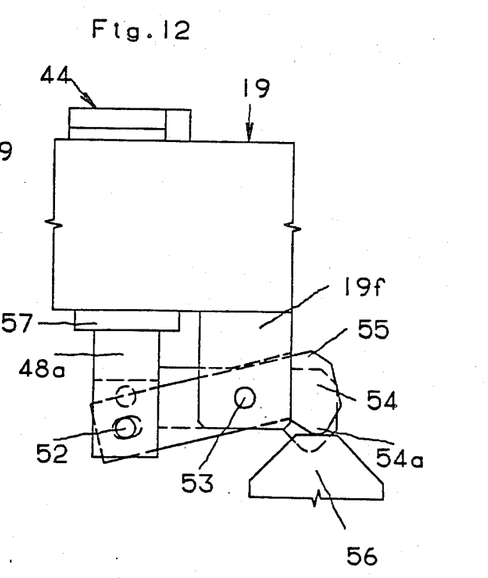
FIG. 12 is an elevational view of the construction shown in FIG. 11 as viewed from the left of that Figure.

The stops 47 and 48 are, dependent upon the displacement of the mold exchanging table 19 in the closing direction of the mold closing unit, guided into and out of their working position by means of a cam control as shown in FIGS. 11 and 12. As it may be particularly well seen in FIG. 10, the stop switches 49, 50 and 51 vertically traversing the mold exchanging table 19 are inductively switchable by the control tabs 44b. The stops 47 and 48 are vertically displaceably supported in the mold exchanging table 19 as particularly well seen in FIG. 11. The stops are, by means of the cam control, in cooperation with a spring engaging a plate 57 moved into or out of the working position in a timed manner. The cam control arrangement comprises stationary cams 56 of the mold exchanging table 19 and two-armed levers supported by pivots 53 in the exchange table 19 which are articulated by means of pins 52 on the shafts (for example, 47a or 48a) of the stops (for example, 47 and 48). Each stop 47 and 48 is controlled by an associated cam 56 via an associated lever 54.

In the description which follows, the mold exchanging operation according to the invention will be set forth.

Figure 6:
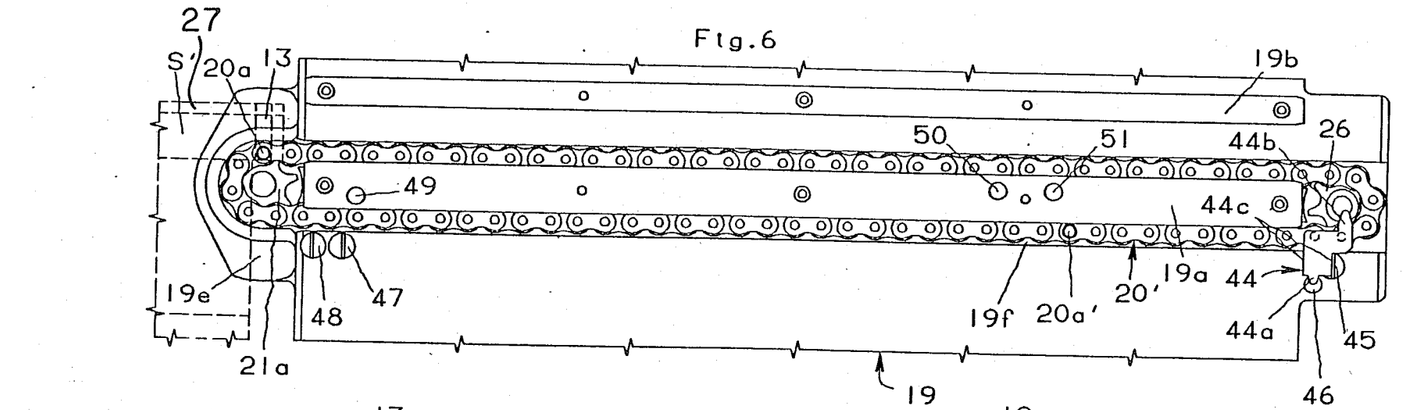
FIGS. 6, 7, 8 and 9 are fragmentary top plan views of the same component forming part of the preferred embodiment of the invention in the zone of a conveyor chain, shown in different conveying positions of the injection mold assembly.

The circulating conveyor chain 20' is arrested in a stop position shown in FIG. 6 as the switching tab 44a actuates the stop switch 46. The conveyor chain 20' is accurately secured in that position by engagement of the abutment edge 44c of the control element 44 with the stop 45 situated adjacent the stop switch 46. Thereafter, the conveyor table 27 is moved to a position shown in FIGS. 6 and 3, while carries an injection mold assembly S' (shown in phantom lines in FIG. 6) taken from store. During this motion the frontal transverse groove 13 of the injection mold assembly S' arrives in a coupling engagement (FIGS. 6 and 4) by partially passing beyond a carrier 20a which is mounted on the stationary conveyor chain 20' and which is aligned with the transverse groove 13 in the closing direction. Thereafter, the conveyor chain 20' is restarted, whereupon it pulls the injection mold assembly S' into the emplacement B (preheating position) of the mold exchanging table 19. As it may be observed in FIG. 7, the last-mentioned conveying motion is, upon reaching the preheating position, stopped by virtue of the switching tab 44b of the control element 44 actuating the stop switch 49. The injection mold assembly S' is secured in the preheating position by virtue of the fact that one of the abutment edges 44c of the control element 44 engages the stop 48. In the preheating position the carrier 20a remains in the engaging position, while a further carrier 20a' is, because of its arcuate travel on the driving sprocket 21 in the course of the conveying motion, laterally pushed into the rearward transverse groove 13a so that in such a conveying state two carriers 21a and 21a' are situated in the engaging (coupling) position.

Figure 9:
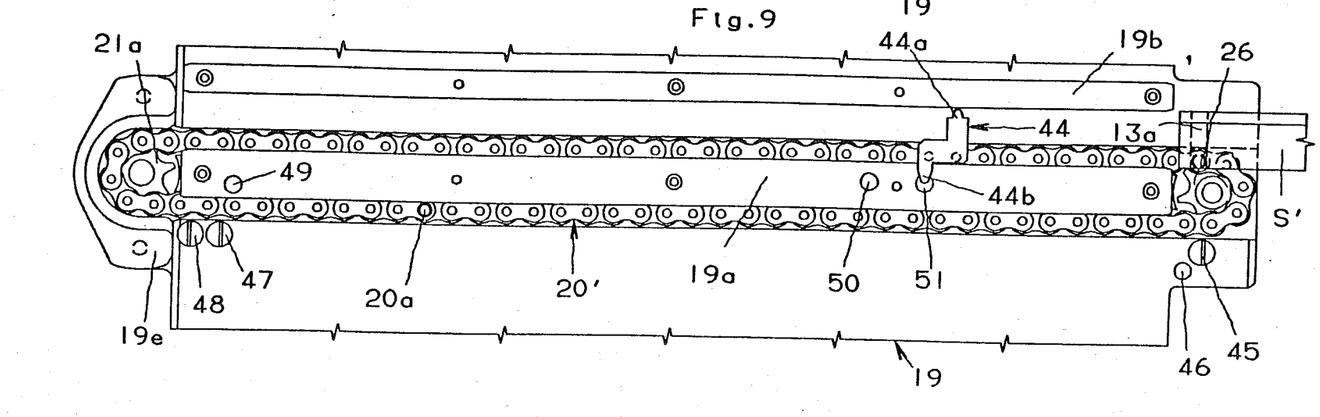

The injection mold assembly S to be replaced and situated in the working position is pulled from the mold clamping space CS to the emplacement A of the mold exchanging table 19 perpendicularly to the closing direction CD by means of the conveyor chain 20. This conveying motion begins in a starting position as shown in FIG. 9 and is stopped in a position shown in FIG. 7 by virtue of the switching tab 44b actuating the stop switch 49. The accurate location of the stop position is secured by an engagement of one of the abutment edges 44c with the stop 47.

Figure 8:
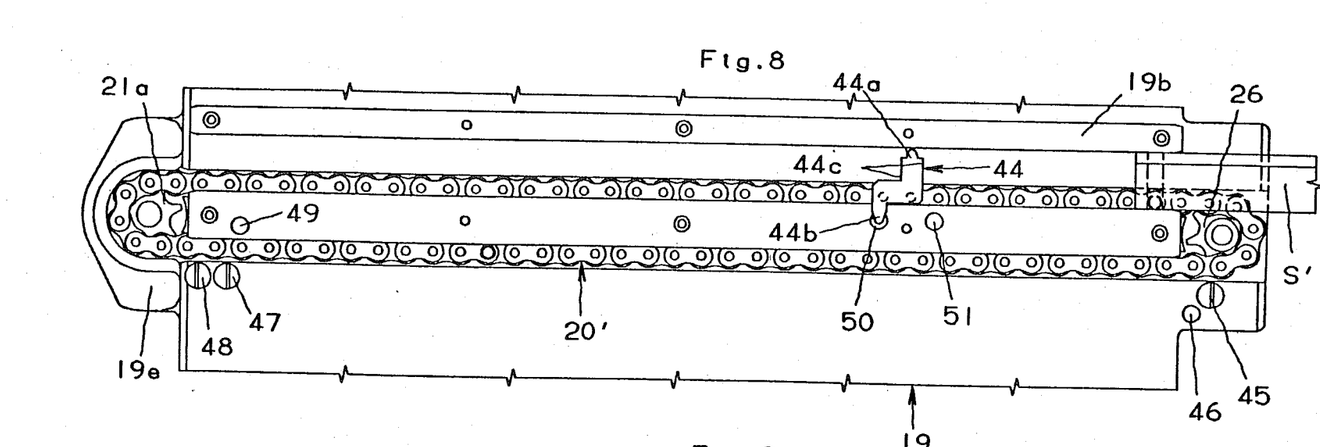

Thereafter, the mold exchanging table 19 is, with both injection mold assemblies S' and S situated in emplacements B and A, respectively, shifted towards the right in such a manner that the injection mold assembly S' will be situated immediately adjacent the clamping space CS of the mold closing unit, whereas the injection mold assembly S will be situated to the right of the clamping space. During this step, the stops 47 and 48 are moved by means of the stationary cams 55 alternatingly into or out of the working position (FIGS. 11 and 12). Thereafter the injection mold assembly S' is moved into position shown in FIG. 8 by means of the conveyor chain 20' and is stopped by virtue of an actuation of the stop switch 50 by the switching tab 44b. This stop position makes possible a timed coupling of the ejector with its drive.

As the next step, the injection mold assembly S' arrives during the course of a further conveying motion into the clamping chamber CS in the working position in which it is arrested by virtue of the actuation of the stop switch 51 by the switching tab 44b, as shown in FIG. 9. At the end of this conveying motion the injection mold assembly S' is in engagement with the mechanical stop 16.

Figure 7:
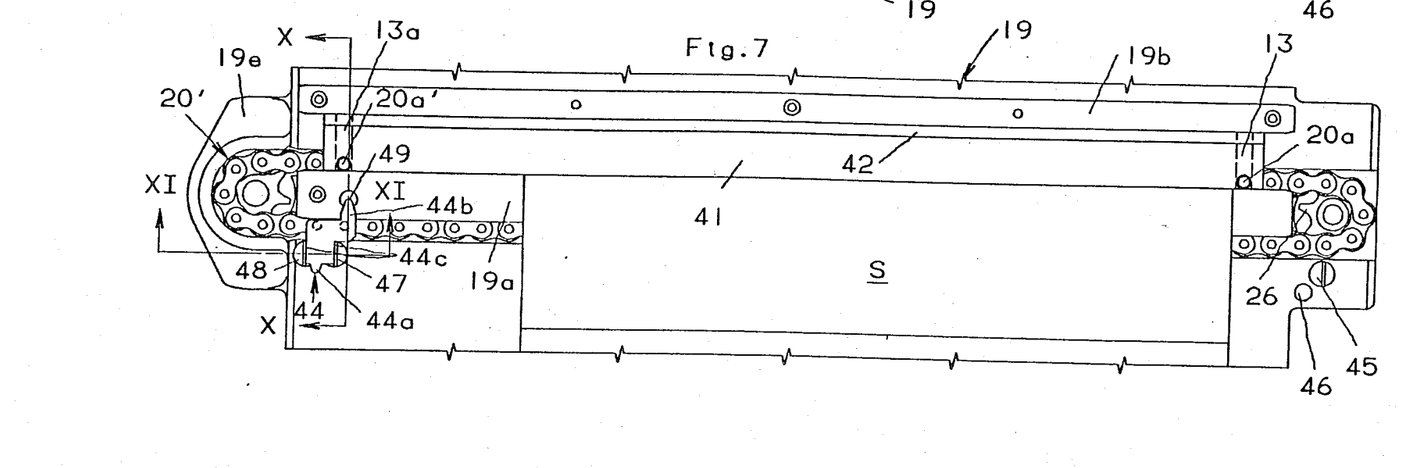

The injection mold assembly S is pushed from the emplacement A onto the conveyor table 27 with the aid of the conveyor chain 20. The conveying motion starting from a position shown in FIG. 7 is stopped by virtue of the actuation of the stop switch 46 by the switching tab 44a in a position according to FIG. 6 and is secured in that position by virtue of one of the abutment edges 44c of the control element 44 engaging the stop 45. The injection mold assembly S may be moved into storage by means of the conveyor table 27 displaced in the closing direction.

The engagement positions of the carriers 20a and 20a' in the transverse grooves 13 and/or 13a thus correspond to each other in all stop positions shown in FIGS. 6–9, regardless of whether such stop positions are reached during the course of a conveying motion of the conveyor table into the working position or from the working position to the conveyor table in the opposite direction.

With the mold closing unit there is associated a set of injection mold assemblies of various dimensions. The mold bodies of these injection mold assemblies which have different dimensions are provided with back plates of identical sizes.

It will be understood that the above description of the present invention is susceptible to various modifications, changes and adaptations, and the same are intended to be comprehended within the meaning and range of equivalents of the appended claims.

What is claimed is:

1. In a horizontal mold closing unit for an injection molding machine, an injection mold assembly having a mold body which includes opposite clamping sides for exposure to clamping forces exerted by the mold closing unit; a clamping space defined within said mold closing unit for accommodating said mold assembly in a working position thereof; said mold assembly being clamped by said mold closing unit in said clamping space; back plates attached face-to-face to the mold body at each clamping side thereof; the mold body having a frontal side and said back plates having an extended portion projecting beyond the mold body at said frontal side thereof; coupling means carried by said injection mold assembly at an underside thereof; a mold exchanging table arranged for displacement adjacent said mold closing unit in a direction parallel to a mold closing direction of said mold closing unit; an endless conveyor chain arranged to convey the injection mold assembly, by cooperating with said coupling means, from said mold exchanging table to the clamping space of said mold closing unit and conversely; the improvement wherein said endless conveyor chain has a chain driving end sprocket and an idling end sprocket mounted on said mold exchanging table and supporting said conveyor chain thereon; said conveyor chain being arranged symmetrically at either side of a vertical symmetry plane belonging to said mold exchanging table and extending parallel to said mold closing direction; said coupling means comprising transverse grooves provided in at least one of said back plates in at least said extended portion thereof; said transverse grooves extending transversely to a main plane of said back plate.

2. A horizontal mold closing unit as defined in claim 1, wherein said mold exchanging table has an emplacement adapted to receive the injection mold assembly; said injection mold assembly having a working position in said mold closing unit; a conveying path extending from said emplacement to said working position; said conveying path having a length; a distance between adjoining transverse grooves on one said back plate being less than the length of said conveying path.

3. A horizontal mold closing unit as defined in claim 1, further comprising stop means in said mold closing unit for abutting said injection mold assembly to determine a working position of said injection mold assembly in said mold closing unit.

4. A horizontal mold closing unit as defined in claim 1, further comprising an insulating plate carried on an outwardly-oriented face of each said back plate in a face-to-face orientation therewith; and centering pins securing each back plate to said mold body.

5. A horizontal mold closing unit as defined in claim 1, further comprising a switching tab mounted on said conveyor chain and having an abutment edge; said switching tab being displaceable by said conveyor chain along a switching tab path; a chain drive including a stop switch mounted on said mold exchanging table in said switching tab path for cooperating with said switching tab; and stops mounted on said mold exchanging table in said switching tab path for abutting said abutment edge of said switching tab when said switching tab cooperates with said stop switch for determining an accurate stop position for said conveyor chain.

6. A horizontal mold closing unit as defined in claim 5, further comprising inductive means for inductively switching said stop switch by said switching tab.

7. A horizontal mold closing unit as defined in claim 5, further comprising a conveyor table arranged to be displaceable along a path extending adjacent said mold exchanging table parallel to said mold closing direction of said mold closing unit; said stop switch, said switching tab and said stop each being present in a plurality and so positioned that a respective said stop switch of said chain drive is actuated by a respective said switching tab and, simultaneously, a respective said abutment edge abuts a respective said stop when one of said mold carrier elements arrives flush with one of said transverse grooves of the injection mold assembly positioned on said conveyor table and when said injection mold assembly, during its travel effected by the conveyor chain, has reached a predetermined position on said mold exchanging table.

8. A horizontal mold closing unit as defined in claim 7, wherein said mold exchanging table is displaceably arranged; said stops are shiftably mounted to assume an advanced, operative position and a withdrawn, inoperative position; further comprising cam control means operatively connected to said mold exchanging table and said respective said stops for moving said stops into an operative or inoperative position as a function of a travelling position of said mold exchanging table.

9. A horizontal mold closing unit as defined in claim 1, wherein said mold exchanging table has first and second emplacements spaced from one another and each adapted to receive an injection mold assembly; said mold exchanging table further having opposite longitudinal sides oriented perpendicularly to said mold closing direction; said conveyor chain being a first conveyor chain bounding said first emplacement along a side thereof; further comprising a second conveyor chain being of a construction substantially identical to that of said first conveyor chain; said second conveyor chain being supported on said mold exchanging table and being spaced from and parallel to said first conveyor chain; said second conveyor chain bounding said second emplacement along a side thereof; said first and second conveyor chains each projecting beyond said opposite longitudinal sides of said mold exchanging table; said transverse grooves being provided in said extended portion at opposite frontal sides of said mold body; said transverse grooves being in an immediate vicinity of a terminal edge of said extended portions.

10. A horizontal mold closing unit as defined in claim 9, wherein said mold exchanging table has a width measured perpendicularly to said vertical symmetry plane; each said back plate having a length measured in a direction parallel to said clamping sides of said mold body; said width of said mold exchanging table and said length of each said back plate being dimensioned such that when said injection mold assembly is positioned in one of said emplacements on said mold exchanging table, those of said transverse grooves being remote from said clamping space are situated just within an outline of said mold exchanging table and those of said transverse grooves being adjacent said clamping space are situated just outside said outline.

11. A horizontal mold closing unit as defined in claim 9, wherein the idling end sprockets of said first and second conveyor chains each have a vertically oriented rotary axis; those of said transverse grooves being adjacent said mold exchanging table when said injection mold assembly is in a working position in said mold closing unit and the rotary axis of said idling end sprockets are situated substantially in a common vertical plane extending parallel to said mold closing direction.

12. A horizontal mold closing unit as defined in claim 9, wherein each said transverse groove has opposite open ends and is of rectangular cross-sectional shape; each back plate of said injection mold assembly being provided with two of said transverse grooves; the distance between two said transverse grooves in each back plate is less than the length of a conveying path of said injection mold assembly from said mold exchanging table to a working position in said clamping space of said mold closing unit.

13. A horizontal mold closing unit as defined in claim 9, wherein said end sprockets of said first and second conveyor chains have a vertical axis of rotation; further comprising mold carrier elements attached to said first and second conveyor chains; said mold carrier elements being arranged for projecting into respective said transverse grooves for conveying said injection mold assembly on and with respect to said mold exchanging table.

14. A horizontal mold closing unit as defined in claim 13, further comprising a conveyor table arranged to be displaceable along a path extending adjacent said mold exchanging table parallel to said mold closing direction of said mold closing unit; said conveyor table having an emplacement for receiving an injection mold assembly; said injection mold assembly being arrangeable on the emplacement of said conveyor table such that some of said transverse grooves are situated adjacent said mold exchanging table and lie in a common vertical plane with rotary axes of said driving end sprockets of said conveyor chains.

15. A horizontal mold closing unit as defined in claim 13, wherein said conveyor chains are formed of chain links articulated to one another by link pins; said mold carrier elements being formed as vertically upward extensions of said of said link pins.

* * * * *